(12) United States Patent
Klein et al.

(10) Patent No.: US 11,240,425 B2
(45) Date of Patent: Feb. 1, 2022

(54) METHOD AND DEVICE FOR TEMPORAL SYNCHRONIZATION OF OPTICAL TRANSMISSION OF DATA IN FREE SPACE

(71) Applicant: Technische Universität Dortmund, Dortmund (DE)

(72) Inventors: Johannes Klein, Holzwickede (DE); Jianshuang Xu, Dortmund (DE); Christian Brauers, Essen (DE)

(73) Assignee: TECHNISCHE UNIVERSITÄT DORTMUND, Dortmund (DE)

( * ) Notice: Subject to any disclaimer, the term of this patent is extended or adjusted under 35 U.S.C. 154(b) by 169 days.

(21) Appl. No.: 16/589,543

(22) Filed: Oct. 1, 2019

(65) Prior Publication Data

US 2020/0177804 A1   Jun. 4, 2020

(30) Foreign Application Priority Data

Oct. 2, 2018 (DE) .................... 10 2018 124 339.1

(51) Int. Cl.
*H04N 5/232* (2006.01)
*H04N 5/353* (2011.01)
(Continued)

(52) U.S. Cl.
CPC ....... *H04N 5/23227* (2018.08); *H04B 10/116* (2013.01); *H04N 5/23206* (2013.01);
(Continued)

(58) Field of Classification Search
CPC .......... H04N 5/23227; H04N 5/23206; H04N 5/3535; H04N 7/025; H04N 7/035;
(Continued)

(56) References Cited

U.S. PATENT DOCUMENTS 8,922,666 B2 * 12/2014 Oshima ................ H04N 5/3532
348/211.99
9,871,587 B2 * 1/2018 Aoyama .............. H04B 10/116
(Continued)

FOREIGN PATENT DOCUMENTS

DE    10 2014 008 405 A1    12/2015
WO    WO2015188948    * 12/2015  ........... H04B 10/116

OTHER PUBLICATIONS

Visible Light Communication Systems Using Blue Color Difference Modulation for Digital Signage, 2016, IEEE Int. Symposium on Personal, Indoor and Mobile Radio Communications (PIMRC), 6 pages.
(Continued)

*Primary Examiner* — Twyler L Haskins
*Assistant Examiner* — Akshay Trehan
(74) *Attorney, Agent, or Firm* — Harness, Dickey & Pierce, P.L.C.

(57) ABSTRACT

A method and a device for time synchronisation of the optical transmission of data in free space from a transmitter to at least one receiver are discussed. In the method and the device, the time synchronisation between the image reproduction of a transmitter and the image recording of a camera is to be improved for the optical free space transmission between transmitter and camera. This is achieved in that a method and a device for time synchronisation of the optical transmission of data in free space from a transmitter to at least one receiver is provided, wherein an arbitrary time recording phase for an image recording by the camera is allowed, wherein an arbitrary recording start time for the image recording by the camera is allowed, an arbitrary implementation of an updating of the image content, typically line by line with a time offset, is performed for the imaging device, an arbitrary implementation of a readout timing and thus coherent shutter timings of the receiving (Continued)

Figure 1:
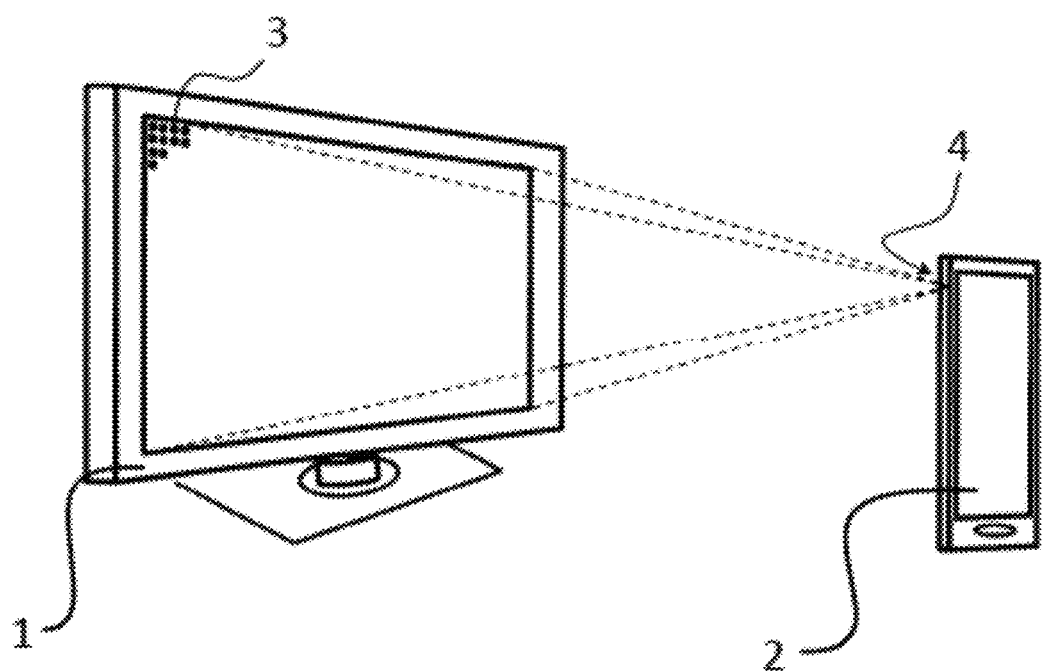

camera is allowed, and a synchronisation is performed subsequently, on the basis of the image recordings not recorded in synchronised fashion.

19 Claims, 10 Drawing Sheets

(51) Int. Cl.
  *H04N 21/436* (2011.01)
  *H04B 10/116* (2013.01)
  *H04N 21/236* (2011.01)
  *H04N 21/414* (2011.01)
  *H04N 21/434* (2011.01)
  *H04N 21/41* (2011.01)
  *H04N 7/035* (2006.01)
  *H04N 7/025* (2006.01)

(52) U.S. Cl.
  CPC ........... *H04N 5/3535* (2013.01); *H04N 7/025* (2013.01); *H04N 7/035* (2013.01); *H04N 21/23614* (2013.01); *H04N 21/4126* (2013.01); *H04N 21/41415* (2013.01); *H04N 21/436* (2013.01); *H04N 21/4348* (2013.01)

(58) Field of Classification Search
  CPC ........... H04N 7/0355; H04N 21/23614; H04N 21/4348; H04N 21/436; H04N 21/41415; H04N 21/4126; H04B 10/116

USPC ............... 348/207.99, 211.99, 211.1–211.14; 345/156

See application file for complete search history.

(56) References Cited

U.S. PATENT DOCUMENTS

| | | | | |
|---|---|---|---|---|
| 2005/0254714 | A1* | 11/2005 | Anne | H04B 10/116 382/233 |
| 2005/0264694 | A1* | 12/2005 | Ilan | H04H 60/48 348/473 |
| 2011/0007160 | A1* | 1/2011 | Okumura | H04N 7/08 348/143 |
| 2011/0007171 | A1* | 1/2011 | Okumura | H04N 7/025 348/211.4 |
| 2011/0063510 | A1* | 3/2011 | Lee | G02F 1/133605 348/563 |
| 2012/0281987 | A1 | 11/2012 | Schenk et al. | |
| 2014/0205136 | A1* | 7/2014 | Oshima | H04N 3/00 382/100 |
| 2018/0091856 | A1* | 3/2018 | Ayers | H04N 21/4627 |

OTHER PUBLICATIONS

Search report of the German Patent and Trademark Office (GPTO) for German Application No. DE10 2018 124 339.1, dated Aug. 13, 2019; no translation provided; 10 pages.

* cited by examiner

METHOD AND DEVICE FOR TEMPORAL SYNCHRONIZATION OF OPTICAL TRANSMISSION OF DATA IN FREE SPACE

CROSS-REFERENCE TO RELATED APPLICATIONS

This application claims the benefit and priority of German Patent Application No. 10 2018 124 339.1 filed Oct. 2, 2018. The entire disclosure of the above application is incorporated herein by reference.

FIELD

The invention relates to a method for time synchronisation of the optical transmission of data in free space from a transmitter to at least one receiver. The invention also relates to a device for the optical transmission of data in free space from a transmitter to at least one receiver.

BACKGROUND

Visible light communication (VLC) is a promising data transmission technology which in recent years has gained in importance. Wireless data transmission by light offers a number of advantages. On the one hand, there is no recourse to scarce spectrum resources, wherein at the same time no concerns are raised with regard to noxious electromagnetic radiation. On the other hand, existing hardware (LED lighting systems, screens, (smartphone) cameras) may be used also for the transmission, wherein the primary function—for example ambient lighting or image reproduction—may be retained. Since there must always be a visual connection between the transmitter and receiver, a controlled, locally limited wireless data dissemination is possible by means of VLC. Various approaches exist, wherein LEDs are used conventionally as transmitters and photodiodes as receivers. Fundamental aspects in this regard were standardised already in 2011 in IEEE 802.15.7. An extension of the standard (IEEE 802.15.7m) is currently being developed, and amongst other things includes the use of camera sensors as receivers. In this case, reference is made to optical camera communication (OCC). OCC systems may be divided in turn into display-based and LED-based systems. Due to the high number of pixels of displays and cameras (approximately 2 million in full HD), high data rates may be attained with display-based OCC (also referred to as display-camera VLC) by spatially parallel transmissions (multiple input multiple output MIMO)) in spite of relatively low image reproduction and recording rates. In current times, where both smartphones with high-resolution cameras and also LCD screens are widespread—both in private households and in the form of advertising and information boards—the optical free space transmission between display and camera is particularly appealing. Public advertising and information screens in airports, train stations, museums, etc. could thus be expanded by additional content (image or audio files, Internet links, etc.), which the user may download by briefly filming the display using the smartphone, without registration. It is also conceivable to use such a system for a cash-fee payment process, in which the user receives the link of a corresponding website for payment by briefly filming the display. The superposed data modulation is not intended to compromise the image reproduction of the display and therefore should not be visible to the human viewer.

DE102014008405A1 discloses a method for the optical transmission of data in free space from a transmitter to at least one receiver, wherein the transmitter is an imaging device with a plurality of pixels, which are controlled by image data $(s_i(x, y))$ of an image sequence $(s_n(x, y))$ that represent images, and the data provided for transmission are divided into a data sequence $(d_n(x, y))$ from a data packet comprising a number (L) of data bits. In the method each data bit is associated with at least one of the pixels and the data packets are each modulated onto the image data $(s_i(x, y))$ of at least one image of the image sequence $(s_n(x, y))$ in pixel-based fashion. The invention also relates to an imaging device for carrying out the method and to a camera capable of recording video for receiving data transmitted optically in free space from a transmitter, which device is configured to decode the data bits used for the modulation and to convert them back into the original data and from the light emissions of pixels of the transmitter that are controlled in modulated fashion in accordance with the method.

Implementation of a transmission method of this kind requires—in particular on the receiver side—different synchronisation and decoding algorithms. One of the greatest challenges here is the time synchronisation between the reproduction of the camera by the display and the recording of the image by the camera. The plurality of existing displays and smartphone cameras additionally exacerbate this problem.

In the transmission method described in the prior art, data in the form of spatially delimited brightness or colour changes which may be decoded by a camera filming the screen are superposed with an image reproduction on an electronic display. A data packet to be transmitted is associated here with individual pixels or a group of pixels. Due to the high resolution of modern flat screens and camera sensors, there are thus a large number of locally distributed transmission channels usable in parallel, whereby a high data rate may be attained. In order to be able to ensure the separation of the data from the image content of the video in the receiver, a different form of modulation is used. To this end, each data bit is transmitted twice, wherein the sign for the second transmission is inverted. With simultaneous repetition of the image content, a separation of the data from the image content in the receiver by subtraction is possible.

$$\text{Image content} + \text{data} - (\text{image content} - \text{data}) = 2 \times \text{data} \quad (1)$$

Proceeding from the above-mentioned prior art, the object of the invention is thus to improve the time synchronisation between the image reproduction of a display and the image recording by a camera for the optical free space transmission between display and camera.

SUMMARY

The problem is solved in accordance with the invention by the features of the independent claims. Advantageous embodiments of the invention are described in the dependent claims.

In accordance with the invention a method for time synchronisation of the optical transmission of data in free space from a transmitter to at least one receiver is thus described, wherein the transmitter is an imaging device with a plurality of pixels which are controlled by image data of an image sequence that represent images, and the data provided for transmission are divided into a data sequence from a data packet comprising a number of data bits and each data bit is associated with at least one of the pixels, and wherein the data packets are each modulated onto the image data of at least one image of the image sequence in pixel-based fashion in the form of am amplitude modulation, wherein the modulation of the image data is performed with a time difference, the image sequence is formed from image pairs of successive images, and wherein the data sequence is formed from pixel-based data packets, of which each second pixel-based data packet to be superposed corresponds to the previous first pixel-based data packet to be superposed with reversed sign, and wherein each first pixel-based data packet to be superposed is superposed with each first image of an image pair and each second pixel-based data packet to be superposed is superposed with each second image of the image pair, and a difference image is generated in the receiver for recovery of the data sequence from each image pair by subtraction of the second image of an image pair from the first image of the same image pair pixel by pixel, the receiver comprises a camera capable of recording video to be arranged at a distance from the imaging device, wherein the camera receives the image sequence sent by the imaging device, characterised in that an arbitrary time recording phase for an image recording by the camera is allowed, wherein an arbitrary recording start time for the image recording by the camera is allowed, an arbitrary implementation of an updating of the image content, typically line by line with a time offset, is performed for the imaging device, an arbitrary implementation of a readout timing and thus coherent shutter timings of the receiving camera is allowed, and a synchronisation is performed subsequently, on the basis of the image recordings not recorded in synchronised fashion.

In accordance with the invention a device for carrying out the method according to one of the preceding claims is additionally described.

The basic concept of the present invention is thus to attain a time synchronisation between the recording of an image by the receiving camera and the reproduction of an image by the imaging device in the optical free space transmission in that a synchronisation by postprocessing of the images not recorded in synchronised fashion by the cameras in respect of the time behaviour, in particular in respect of the recording phase, is performed. Thus, the data transmission does not require active synchronisation, that is to say no synchronisation of the camera timings, in particular in respect of the recording phase, to the timing of the image reproduction before the actual recording of the image, in order to realise a functioning optical free space transmission on the basis of the time differential modulation. This has the advantage, in relation to a conceivable active synchronisation before the actual recording of an image, that the time that the user must spend aligning the receiving camera with the imaging device is reduced, since an active synchronisation process before the actual recording of an image for the receipt of the data packet to be transmitted, on account of the fact that, in the proposed method for optical free space transmission, no further transmission channel, which could be used for example for the synchronisation, is proposed in addition to the optical transmission channel, may be performed only on the basis of an evaluation of images recorded previously only in unsynchronised fashion. This image recording and image evaluation process to be performed prior to the actual image recording in the case of an active synchronisation of the camera timing, and also the subsequent adaptation of the camera timing performed on the basis of the image evaluation, would therefore require a certain amount of time, which would add to the amount of time that the user must spend aligning the receiving camera during the image recording of the actual useful data with the imaging device. Since the acceptance of such a data transmission method is likely dependent for the most part on the speed of the transmission and therefore on the amount of time that the user must spend aligning the camera with the imaging device, the subsequent synchronisation, i.e. performed after the unsynchronised image recording, which may be performed immediately after the local alignment of the camera with the imaging device, is an advantageous concept.

It is known that typical imaging devices, such as LCD or OLED displays, which are proposed as transmitters for optical free space transmission, in the event of a change from an image of a represented image sequence to the next image of the represented image sequence, do not perform an updating of the image content in parallel for all representing pixels of the imaging device, but instead line by line with a time offset. Depending on the manufacturer and model of the imaging device, the implementation of such a line-by-line scanning behaviour may vary, which means that the time offset between the updating of the first line and the updating of the last line of a display may vary. It is also known that many cameras, in particular smartphone cameras, when recording images have a line-by-line scanning behaviour of this kind, which means that not all light-active elements of the image sensor of the camera are exposed and read simultaneously, but instead line by line with a time offset. Reference is made in this case to a rolling-shutter sensor. By contrast, in the case of global shutter camera sensors, the exposure and reading of the light-active elements are performed at the same time for the entire sensor. An advantage of the present invention is that the implementation of this temporal scanning behaviour, both by the imaging device and by the camera, is irrelevant to the successful performance of the synchronisation. In the case of an active synchronisation of the camera timing, the timing of the image recording by the camera should be synchronised very precisely in respect of all parameters, in particular in respect of the time offset between the reading of the first and the last line of the image sensor, with the timing of the image reproduction of the imaging device, which is not readily possible with the majority of the cameras, in particular smartphone cameras, available on the market. In comparison to a conceivable active synchronisation, the present invention therefore offers the advantage that a synchronisation of the image reproduction of the imaging device and the image recording by the camera may be performed without complete control of the camera timing, which enables an implementation on many different cameras, in particular on those in which the options for setting the temporal behaviour of the image recording are limited, for example as in the case of smartphone cameras, without the need for extended access to the controller of the temporal behaviour of the camera sensor.

In an advantageous embodiment of the invention the image sequence is an image sequence of successive image pairs of identical images, in each case with identical image data.

In a further advantageous embodiment of the invention the camera capable of recording video has an image recording rate $f_C$ and an exposure time $t_{exp}$ for recording images, the imaging device has an image reproduction rate $f_D$ and a mean reaction time for an image reproduction of the imaging device $\overline{t_R}$, wherein the exposure time $t_{exp}$ and the image-recording rate $f_C$ are set in accordance with the following mathematical relationship:

$$t_{exp} \leq \frac{1}{f_D} - \frac{1}{f_C} - \overline{t_R}$$

-continued $$f_C \geq \left(\frac{1}{f_D} - t_{exp} - \overline{t_R}\right)^{-1}$$

The minimum required image recording rate $f_C$ or the maximum admissible exposure time $t_{exp}$ of the camera are given by the stated mathematical relationships depending on the other of the aforesaid camera parameters, and the image reproduction rate $f_D$ and the mean reaction time $\overline{t_R}$ of the imaging device, wherein it is ensured that all image sections of all images of the image sequence presented by the imaging device are provided fully in the images recorded by the camera, i.e. without any mixing with temporally adjacent images of the image sequence, whereby a reconstruction of all images presented by the imaging device and recorded by the receiving camera is possible in the receiver. Thus, a balancing in both formulas is sought, since in this case an optimal working point is reached, at which the complete reconstruction of all images of the transmitter-side image sequence is possible and at the same time the image recording rate $f_C$ of the camera recording under the described circumstances is only selected to be as high as necessary, or the maximum possible exposure time $t_{exp}$ for successful synchronisation under the described circumstances is utilised.

In an advantageous embodiment of the invention all image recordings by the camera are divided in the vertical image direction into $n_v$ image sections of equal size, wherein the time synchronisation between the image reproduction of the imaging device and the image recording of the camera is performed separately for each vertical image section. Due to the possible different temporal scanning behaviour of imaging devices and cameras in the vertical image direction and due to the deviation of the image recording rate $f_C$ from the image reproduction rate $f_D$, mixed images, i.e. image recordings that contain, in an upper spatial image section, a recording of an another image of the transmitter-side image sequence as compared to in a lower part of the image recording, are created with the unsynchronised image recording by the camera. The spatially vertical positions of these potential image transitions within the camera recordings are not known to the receiver and vary in the case of $f_C \neq f_D$ in different chronologically successive camera recordings. In order to take into consideration the resultant phase relation between the image reproduction and the image recording, which phase relation is different for different image sections, the image recordings in the receiver are divided into $n_v$ vertical spatial image sections and the synchronisation for each image section is performed separately, wherein it is approximated that the phase relation between the image reproduction and the image recording is constant within a spatial vertical section. An advantage of this approach is that any combinations of implementations of the spatial-temporal scanning behaviour of the imaging device and of the receiving camera are in this way allowed for the data transmission, even if the scanning direction of the spatial-temporal scanning behaviour of the display and camera are opposite.

In a further advantageous embodiment of the invention a time synchronisation between the image reproduction of the imaging device and the image recording of the camera is attained in that, in the receiver, once the image has been recorded, a reconstruction of the transmitter-side image sequence is performed on the basis of the image recordings by performing, for each vertical image section, a separate allocation of the image sections within the image recordings of the camera to the individual images of the transmitter-side image sequence.

In an advantageous embodiment of the invention the section-by-section reconstruction of the images of the image sequence displayed on the imaging device is performed on the basis of the image recordings in the receiver in that the image pairs of the transmitter-side image sequence within the image recordings are searched image section by image section in that, in each vertical image section, all difference image sections from all pairs of image sections potentially relevant for the generation of a difference image section are produced from the chronologically successive image recordings and compared with one another, wherein the difference image section which, in relation to a mean signal level, has a strongest data signal created by the modulation of the pixel-based data packet, is used within the particular vertical image section for the subsequent generation of a difference image. Thus, the known correlation between two pixel-based data packets which are superposed with an image pair of the image sequence with the time differential modulation is utilised, wherein the correlation is such that both pixel-based data packets superposed with an image pair are the same apart from their sign.

In a further advantageous embodiment of the invention a comparison criterion for the comparison of the potential difference image portions produced section by section is defined, wherein for this purpose the sum of the amounts of all pixel values $B_{sum}(k_X, k_Y, n)$ of the particular difference image section n, which was produced from the image recordings $k_X$ and $k_Y$ by pixel-based subtraction, is used in accordance with the following formula:

$$B_{sum,modCh}(k_X, k_Y, n) = \sum_{p=1}^{W} \sum_{q=(n-1)\cdot H+1}^{n\cdot H} |r_{modCh}(p, q, k_X) - r_{modCh}(p, q, k_Y)|$$

Here:
$k_X$, $k_Y$ image recording index no. X, Y
N running index of the vertical image sections, $n=1 \ldots n_v$
p, q image sensor pixel coordinates of the image recordings
W, H image width W and image height H of the image recordings in image sensor pixel coordinates
modCh modulated colour channel of the image recordings, wherein a modulated colour channel is a colour channel within a colour space which was used on the transmitter side for the pixel-based modulation of the data sequence
$f_{modCh}(p, q, I_X)$ intensity value, wherein what is meant here is the height of the amplitude of the digital representation of an image, of the colour channel modCH at the image sensor coordinates p and q in image recording X In an advantageous embodiment of the invention an extended comparison criterion is defined, in which $B_{sum}(k_X, k_Y, n)$ a calculation is made in each case for a modulated colour channel and for a colour channel not used for the data modulation, that is to say a non-modulated colour channel, wherein a modulated colour channel is a colour channel within a colour space which was used on the transmitter side for the pixel-based modulation of the data sequence, wherein the extended comparison criterion is then calculated as follows:

$$B_{sum,extended}(k_X, k_Y, n) = \frac{B_{sum,modulated\ colour\ channel}(k_X, k_Y, n)}{\sqrt{B_{sum,non-modulated\ colour\ channel}(k_X, k_Y, n)}}$$

The advantage here is that a comparison of the potentially produced difference images with the extended comparison criterion then also leads to a reliable and correct result if the transmitter-side image sequence modulated by the pixel-based data packets is an image sequence with big differences in respect of the image contents of successive image pairs, that is to say is an image sequence of a video, in which many movements of the image content occur. The time synchronisation presented in this invention consequently functions by use of the extended comparison criterion, regardless of whether the image sequence displayed by the imaging device is a static image or a video sequence with movements.

In a further advantageous embodiment of the invention the same pixel-based data packet is superposed with each image pair. It is advantageous here that, since the same pixel-based data packet is superposed with each image pair, the visibility of the superposed time differential amplitude modulation to the human viewer is reduced in comparison to the case in which a new pixel-based data packet is superposed with each image pair with otherwise identical modulation parameters, since, due to the constant change over time between a modulation-induced increase and a modulation-induced decrease of the brightness value of the pixel or a subpixel of the imaging device, for example the red or blue subpixel typical for imaging devices, fewer temporally low-frequency components are created by comparison than in the other described case, which is advantageous for the sought lack of visibility of the data modulation to the human viewer, since temporally low-frequency brightness or colour changes are known to be perceived to a greater extent by the humanise than temporally high-frequency brightness or colour changes.

In an advantageous embodiment of the invention a group of bs×bs pixels of the imaging device are combined to form a data block which is modulated by the same data bit of the data sequence, wherein a transmitter-side local filtering of each pixel-based data packet is additionally performed with the following filter matrix:

$$\begin{matrix} & \overbrace{\phantom{bs}}^{bs} & \\ \begin{bmatrix} 1 & \cdots & 1 & -1 & \cdots & -1 \\ \vdots & \ddots & \vdots & \vdots & \ddots & \vdots \\ 1 & \cdots & 1 & -1 & \cdots & -1 \\ -1 & \cdots & -1 & 1 & \cdots & 1 \\ \vdots & \ddots & \vdots & \vdots & \ddots & \vdots \\ -1 & \cdots & -1 & 1 & \cdots & 1 \end{bmatrix} & \Big\} bs \end{matrix}$$

It is advantageous here that, by the filtering with the specified filter matrix, the visible data block size, that is to say the two-dimensional amount of locally adjacently arranged pixels of the imaging device which is modulated with the same amplitude and with the same sign, is reduced to a quarter of the visible block size which was created by the modulation without filtering of the pixel-based data packet with the specified filter matrix. The superpositioning of the filtered pixel-based data packet thus contains finer local structures than without filtering, that is to say locally of higher frequency, which in turn reduces the visibility to the human viewer with otherwise identical modulation parameters, since the perception of flickering by the human eye is known to be dependent also on the spatial frequency of the flickering surface.

In a further advantageous embodiment of the invention, from the amount of provided image recordings of the camera, the difference image that is the same in respect of the superposed pixel-based data packet is produced more than once in the receiver, and the resultant difference images that are the same in respect of the pixel-based data packet are summed pixel by pixel, thus resulting in an improved signal-to-noise ratio as compared to an individual difference image. The signal-to-noise ratio is improved with the pixel-by-pixel summing of a plurality of difference images that are the same in respect of the pixel-based data packets, since the noise created at the camera sensor when the images are recorded, in particular the shot noise, is statistically independent of chronologically successive image recordings. The following is generally known: With the additive superpositioning of two digital signals which are the same in respect of the useful signal component and are thus correlated, but with which the superposed noise, which in both cases has the same noise power, is uncorrelated, the signal-to-noise ratio is better by a factor of two than the signal-to-noise ratio of the individual signals, wherein precisely this fact is utilised in the method step described in this claim.

In an advantageous embodiment of the invention each image recording of the camera or each of the produced individual difference images in the receiver is subjected before the further processing to a local filtering with the same filter matrix with which each pixel-based data packet was filtered locally on the transmitter side. The receiver-side local filtering of the difference image or of the individual image recordings with the same filter matrix with which the pixel-based data packet was filtered on the transmitter side offers a total of three advantages. Firstly, a filtering that is optimal in respect of the signal-to-noise ratio resulting in the receiver is performed (matched filter approach, known from the literature).

Secondly, the detection of the optimal local scanning points within the difference images produced in the receiver is facilitated by the receiver-side filtering, since, as a result of this filtering, provided the pixel-based data packet was subjected on the transmitter side to the same local filtering, amplitude peaks are created in the optimal local scanning points and may be detected more easily by appropriate image evaluation algorithms than the centre point of rectangular data blocks, as would occur in the difference image in the receiver without transmitter-side and receiver-side local filtering.

Thirdly, due to the filtering, partly undesirable signal components in the produced difference images resulting from image content differences of the successive images of the image sequence displayed on the transmitter side that are necessary in order to produce a difference image and not resulting from the superposed pixel-based data packet are filtered out, in particular signal components from image content differences that have a constant amplitude over an entire data block of size bs×bs, that is to say represent a steady component within a data block of size bs×bs.

In a further advantageous embodiment of the invention the produced and locally filtered difference images are summed inclusive of sign, wherein, from the second produced difference image, the new difference image to be summed is additively superposed with the first difference image or the previous difference images already summed at this point, once with positive and once with negative pixel-based sign by way of trial, and then the sign with which the data signal contained in the summed difference image and created by the transmitter-side modulation of the pixel-based data packet is strongest is determined in a comparison of the two difference images summed by way of trial.

In an advantageous embodiment of the invention, for the comparison of the strength of the data signal contained in the difference images summed by way of trial with positive and negative sign, the sums of the amounts of the intensity values, wherein what is meant here is the height of the amplitude of the digital representation of the summed difference image, of all pixels of the resultant difference images are compared with one another.

In a further advantageous embodiment of the invention each image recording of the camera or each of the produced difference images in the receiver is divided into $n_v$ vertical image sections of equal size, wherein the summing, inclusive of sign, of the produced difference images is performed separately for each vertical image section. Due to the possible different temporal scanning behaviour of imaging devices and cameras in the vertical image direction and due to the deviation of the image recording rate $f_C$ from the image reproduction rate $f_D$, mixed images, i.e. image recordings that contain, in an upper spatial image section, a recording of an another image of the transmitter-side image sequence as compared to in a lower spatial image section of the image recording, are created with the unsynchronised image recording by the camera. As a result, with the production of the difference images in the receiver that are the same in respect of the superposed pixel-based data packet, difference images are created that in an upper spatial section have a different sign than in a lower spatial image section. The spatially vertical positions of these potential image transitions within the camera recordings and the resultant sign change within the produced difference images are not known to the receiver and vary in the case of $f_C \neq f_D$ in different chronologically successive camera recordings. In order to take this fact into consideration, the image recordings in the receiver are divided into $n_v$ vertical spatial image portions and the summing of the difference images produced in the receiver for each vertical image portion is performed separately, wherein it is approximated here that the phase relation between the image reproduction and the image recording is constant within a spatial vertical portion. An advantage of this approach is that any implementations of the spatial-temporal scanning behaviour of the imaging device and of the receiving camera in combination are in this way allowed for the data transmission, even if the scanning direction of the spatial-temporal scanning behaviour of the display and camera are opposite.

In a further advantageous embodiment of the invention each of the produced difference images in the receiver is divided into a, vertical image sections of equal size and into $n_h$ horizontal image sections of equal size, whereby a two-dimensional arrangement of $n_v \times n_h$ image sections is created, wherein the summing, inclusive of sign, is performed separately for each image section. The spatial two-dimensional division of the difference images produced on the receiver side into $n_v$ vertical image sections and $n_h$ horizontal image sections and the subsequent separate summing, inclusive of sign, of the difference images has the advantage that in this way the synchronisation unction is also when the scanning direction of the updating, line by line, on the transmitter side of the image content of the imaging device and the scanning direction of the exposure and reading process, line by line, by the receiving camera are rotated relative to one another, in particular by 90° or −90°. This would be the case for example if an imaging device positioned normally in landscape format were recorded with the camera of a smartphone in portrait format, since both line scans run generally along the shorter edge of the screen of the imaging device and the camera sensor respectively. This offers an advantage since the user of the smartphone may record an image in this way easily using just one hand and with the smartphone held typically in the portrait format. Due to the extension, the synchronisation is possible for any arbitrary rotation angle about the line of visual contact between imaging device and the receiving camera.

In a further advantageous embodiment of the invention, following the section-based summing, inclusive of sign, of the difference images, the possibly different signs of the individual image sections, if necessary, are matched to one another by comparing the boundaries between the image sections that are potentially to be matched in respect of the sign, wherein a high negative correlation indicates a sign difference and a high positive correlation indicates a sign uniformity between two adjacent sections. With the separate accumulation of the individual local image sections of the difference images produced in the receiver, it may be that not all image sections have the same pixel-based sign. In order to obtain an accumulated difference image from which the superposed data may then be reconstructed, the signs of the individual image sections must be matched to one another, which is performed in that, subsequently to the summing of the difference images in the summed difference image, all occurring image section boundaries created by the image section divisions according to claim 15 or 16, are examined and assessed by comparing with one another the image rows or image columns positioned closest to the section boundary for each two image sections arranged locally adjacently to one another. The comparison is carried out in such a way that the image row or image column to be compared of the first image section is added once by way of trial to that of the second image section, pixel by pixel, and is subtracted once by way of trial from that of the second image section, pixel by pixel, and then for both variants the sum of the amounts of all resultant added and subtracted pixel values is formed and these are compared in relation to the level of the resultant value. In the event that the pixel-by pixel addition of the adjacent image rows and image columns produces a greater resultant value than the pixel-bi-pixel subtraction, the signs of the examined adjacent image sections are the same in the summed difference image, whereas in the reverse scenario the signs of the examined adjacent image sections are different and a matching must be performed by pixel-based inversion of one of the examined image sections.

In an advantageous embodiment of the invention, each three chronologically successive images of the imaging device are combined to form an image group and are modulated, wherein in each case the first image is modulated with positive sign, the second image is not modulated, and the third image is modulated with negative sign. This alternative modulation schema for the time differential modulation offers the advantage that, with use of this modulation schema, a time synchronisation also functions when the image recording rate $f_C$ of the camera is not approximately the same, but approximately only half or only a quarter of only an eighth as high as the image reproduction rate $f_D$ of the imaging device, i.e. $f_C \approx f_D/2$ or $f_C \approx f_D/4$ or $f_C \approx f_D/8$. This may be of advantage since a limiting measure for the optical free space transmission between an imaging device and a receiving camera may be the maximum image recording rate of the camera, since this may be smaller than the maximum image reproduction rate $f_D$ of the imaging device. Due to the use of this alternative modulation schema, when the imaging device displays the modulated image sequence a higher image repetition rate may be set in comparison to the maximum image recording rate of the camera, which is beneficial to the visibility of the superposed modulation.

DRAWINGS

The invention will be explained in greater detail hereinafter on the basis of preferred embodiments with reference to the accompanying drawing. The shown features may represent an aspect of the invention individually or in combination. Features of various exemplary embodiments are transferable from one exemplary embodiment to another.

In the drawing

Figure 2:
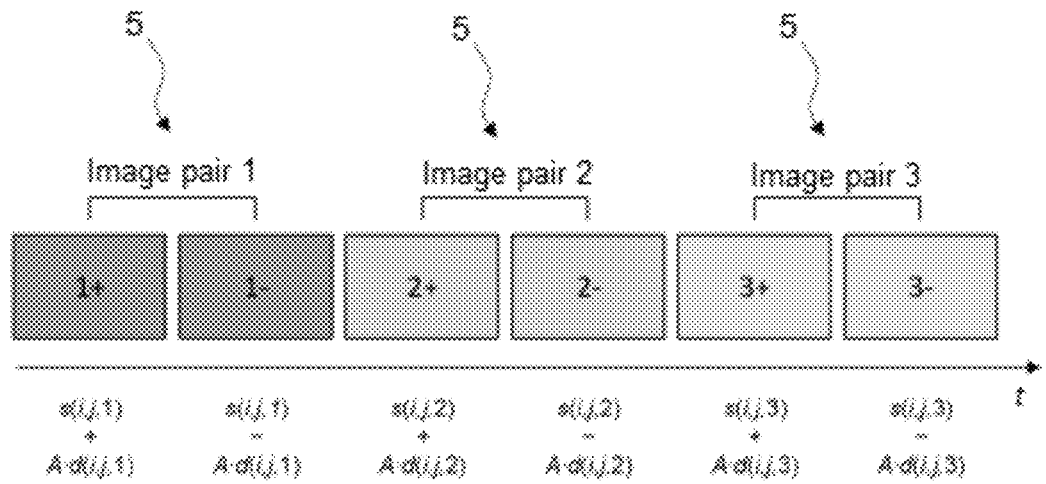
Figure 3:
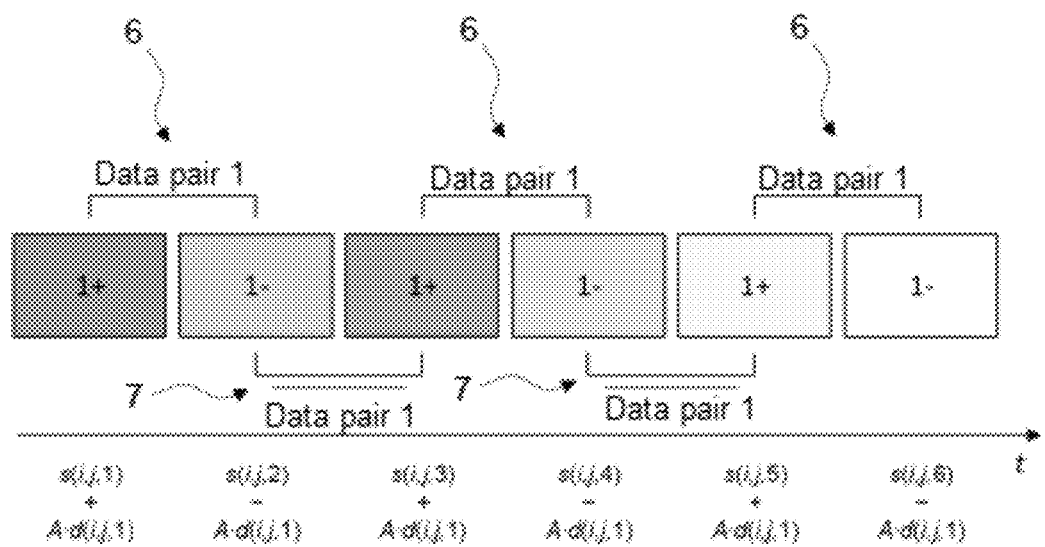
Figure 4:
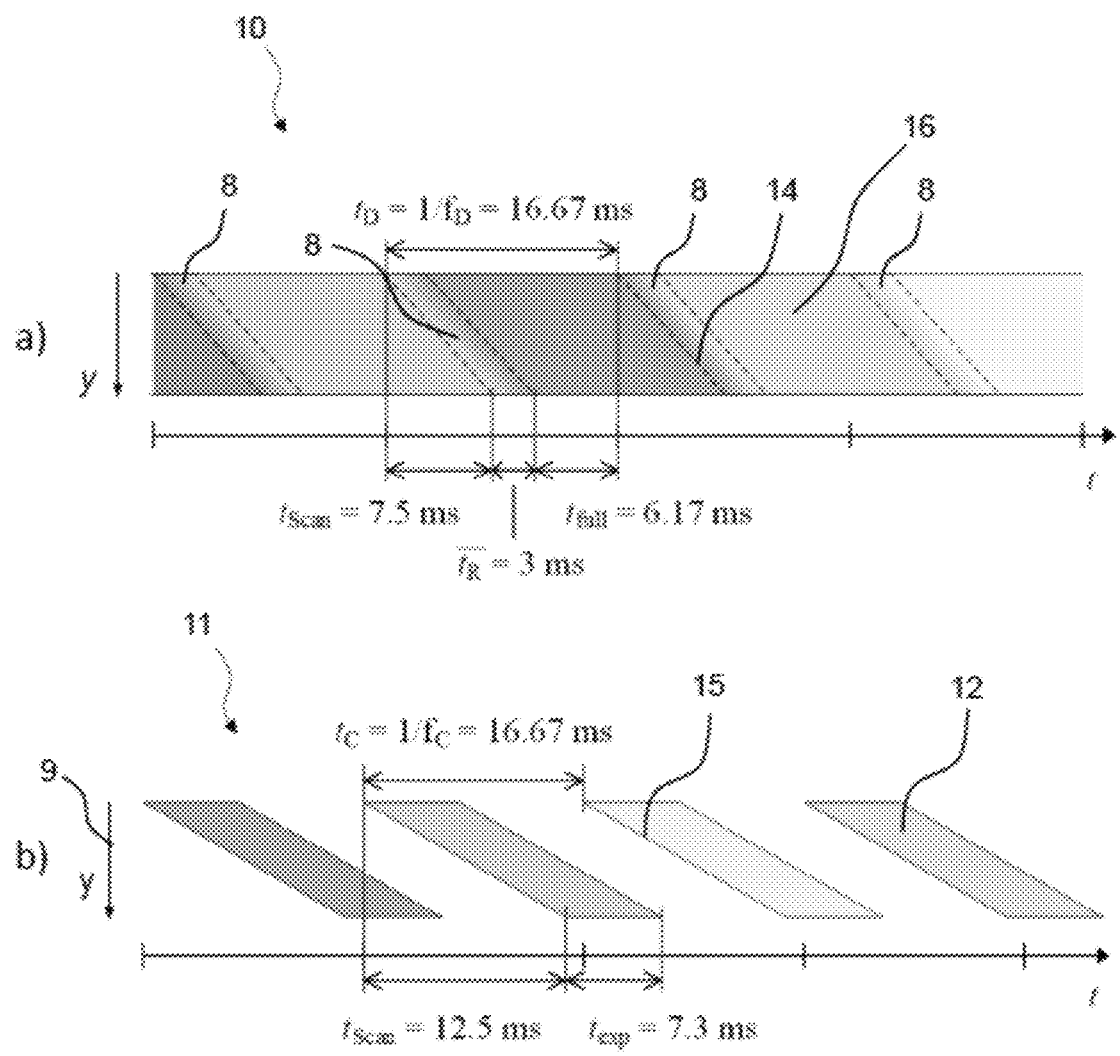
Figure 5:
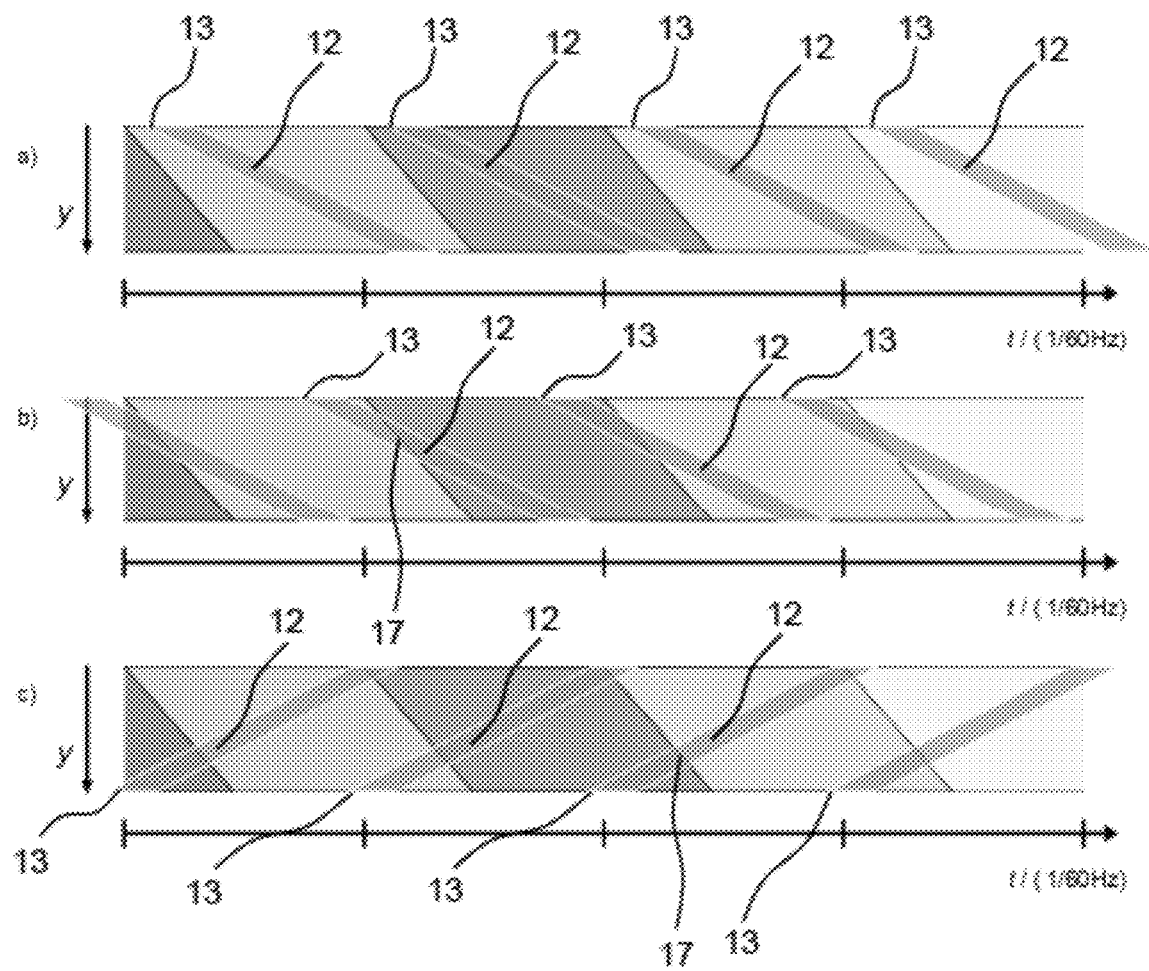

FIG. 1 shows an arrangement of transmitter and receiver for optical transmission of data in free space, FIG. 2 shows a temporal display sequence of the modulation of pixel-based data packets 1, 2 and 3 with use of the time differential modulation with image content repetition in accordance with a first exemplary embodiment of the invention, FIG. 3 shows a temporal display sequence of the modulation of pixel-based data packets with use of the time differential modulation without image content repetition in accordance with a second exemplary embodiment of the invention, FIG. 4 shows the space-time modelling of the time-space reproduction behaviour of typical devices, wherein FIG. 4*a*) relates to LCD displays, and FIG. 4*b*) shows the space-time modelling of the time-space reproduction behaviour of typical rolling-shutter CMOS cameras, FIG. 5 shows the space-time modelling of an image reproduction and an image recording with identical image reproduction and image recording rate $f_C = f_D$ for three different random phase positions of the image recording, wherein the scanning direction of the line-by-line scanning behaviour of display and camera in FIGS. 5*a*) and *b*) is the same and is opposite in FIG. 5*c*).

Figure 6:
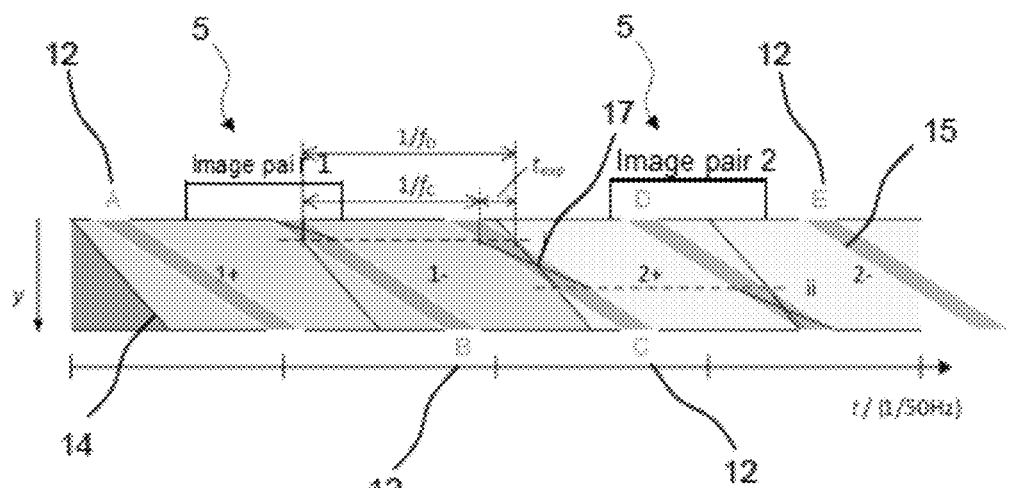
Figure 7:
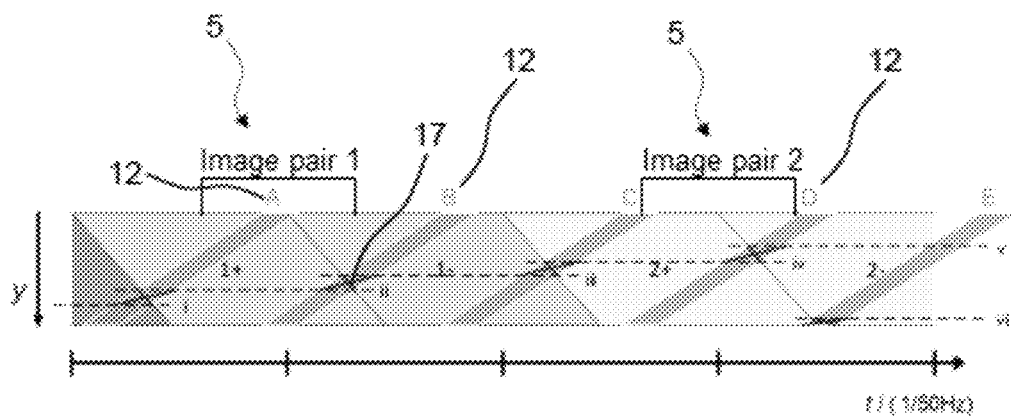
Figure 8:
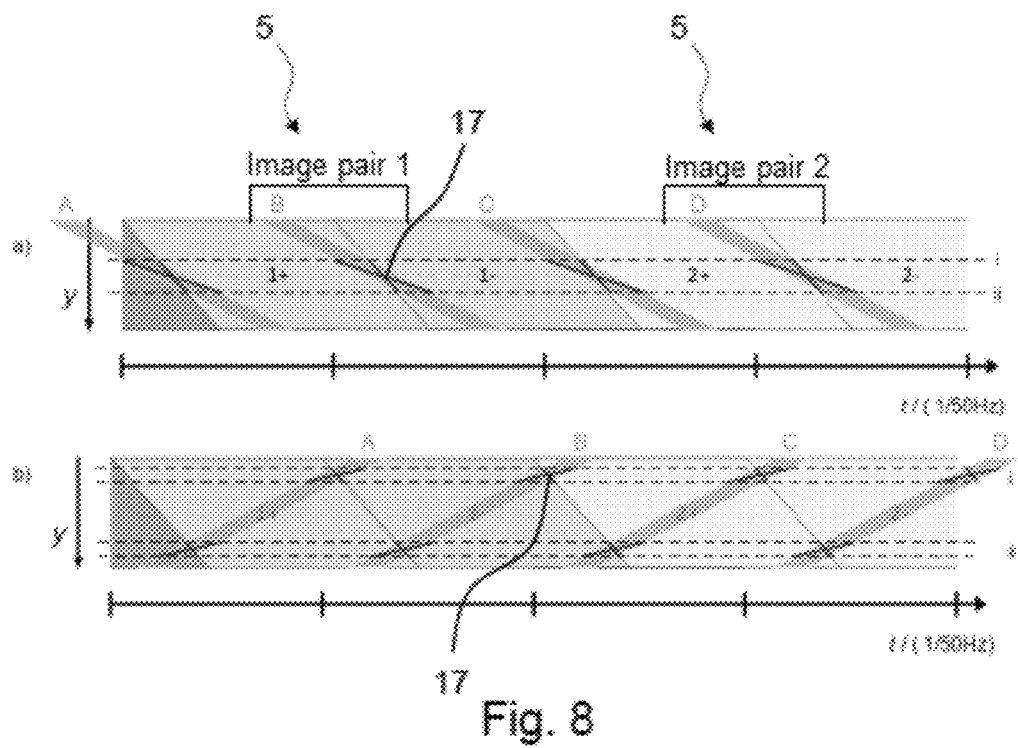
Figure 9:
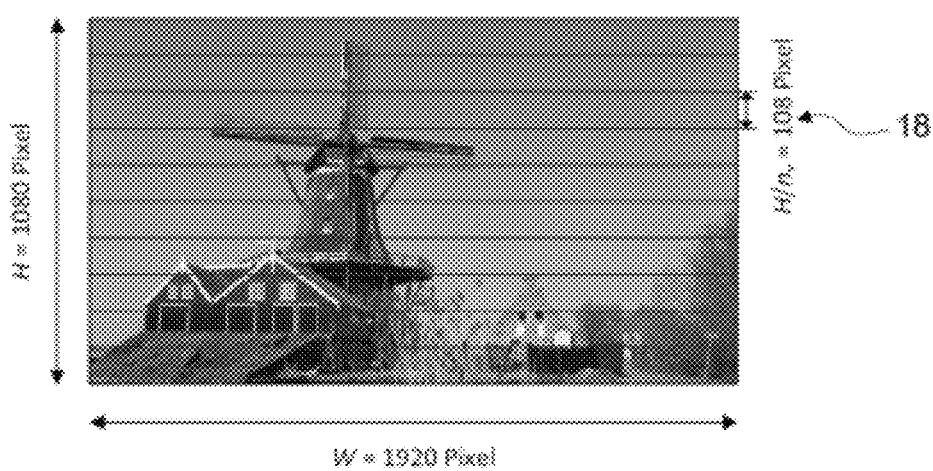
Figure 10:
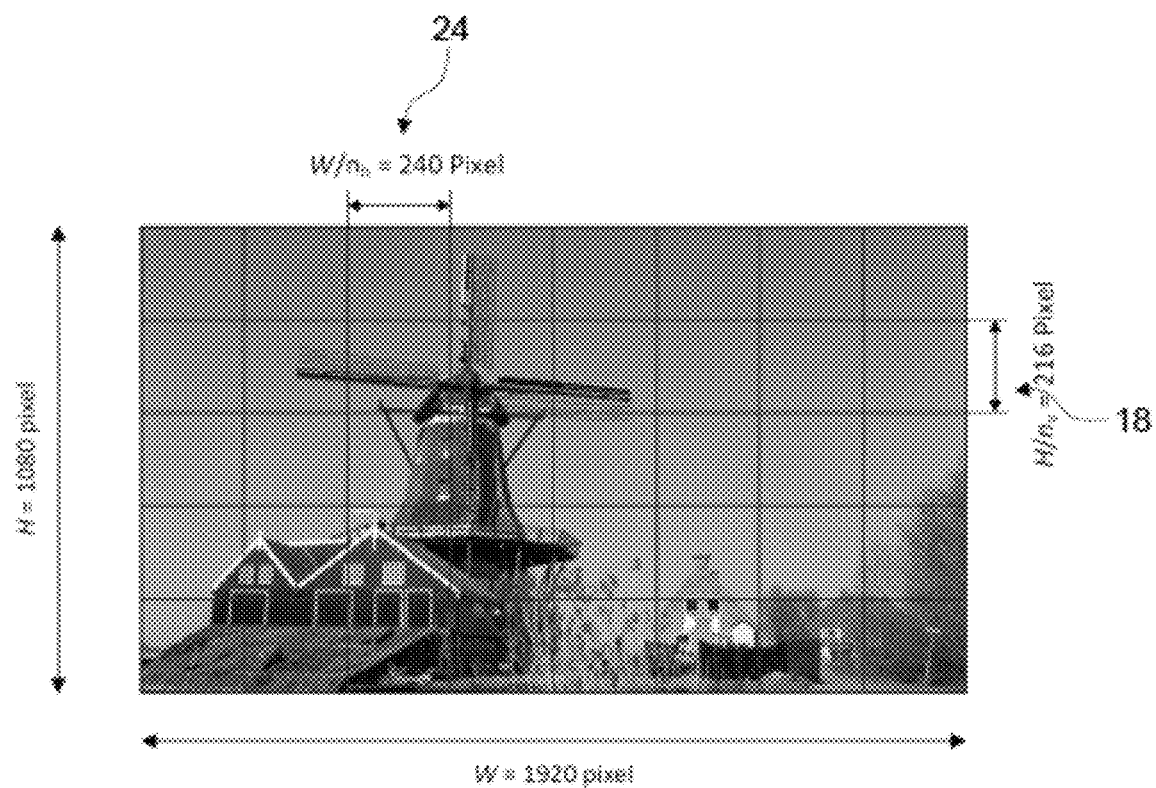
Figure 11:
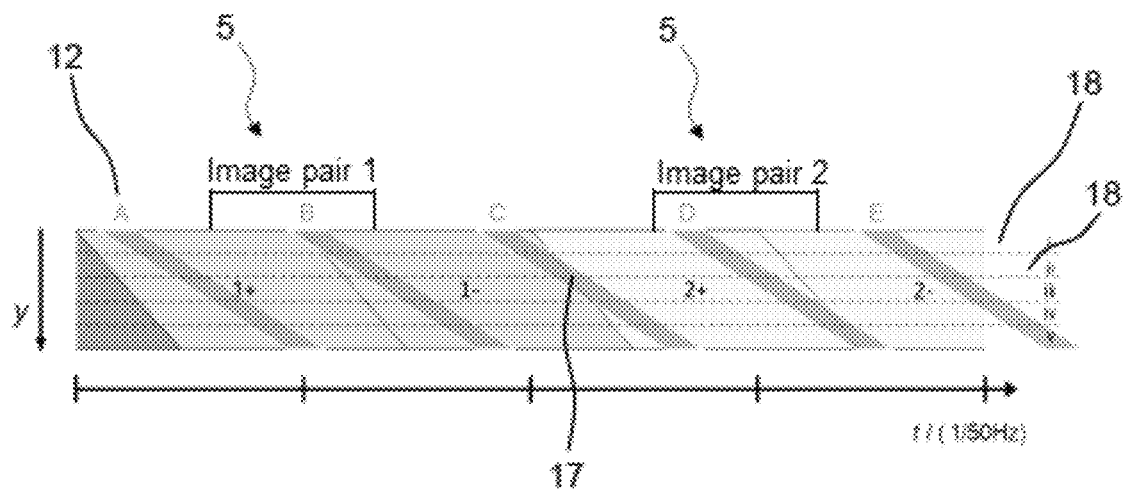
Figure 12:
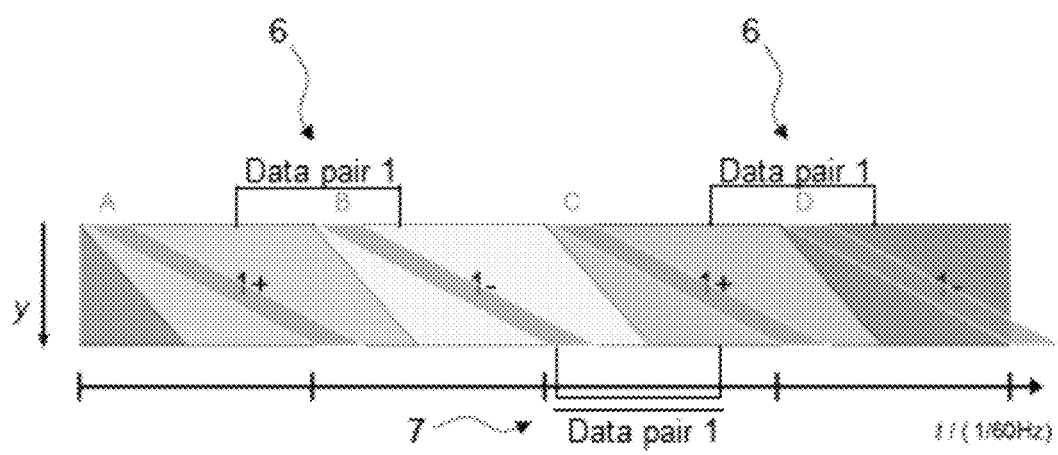
Figure 13:
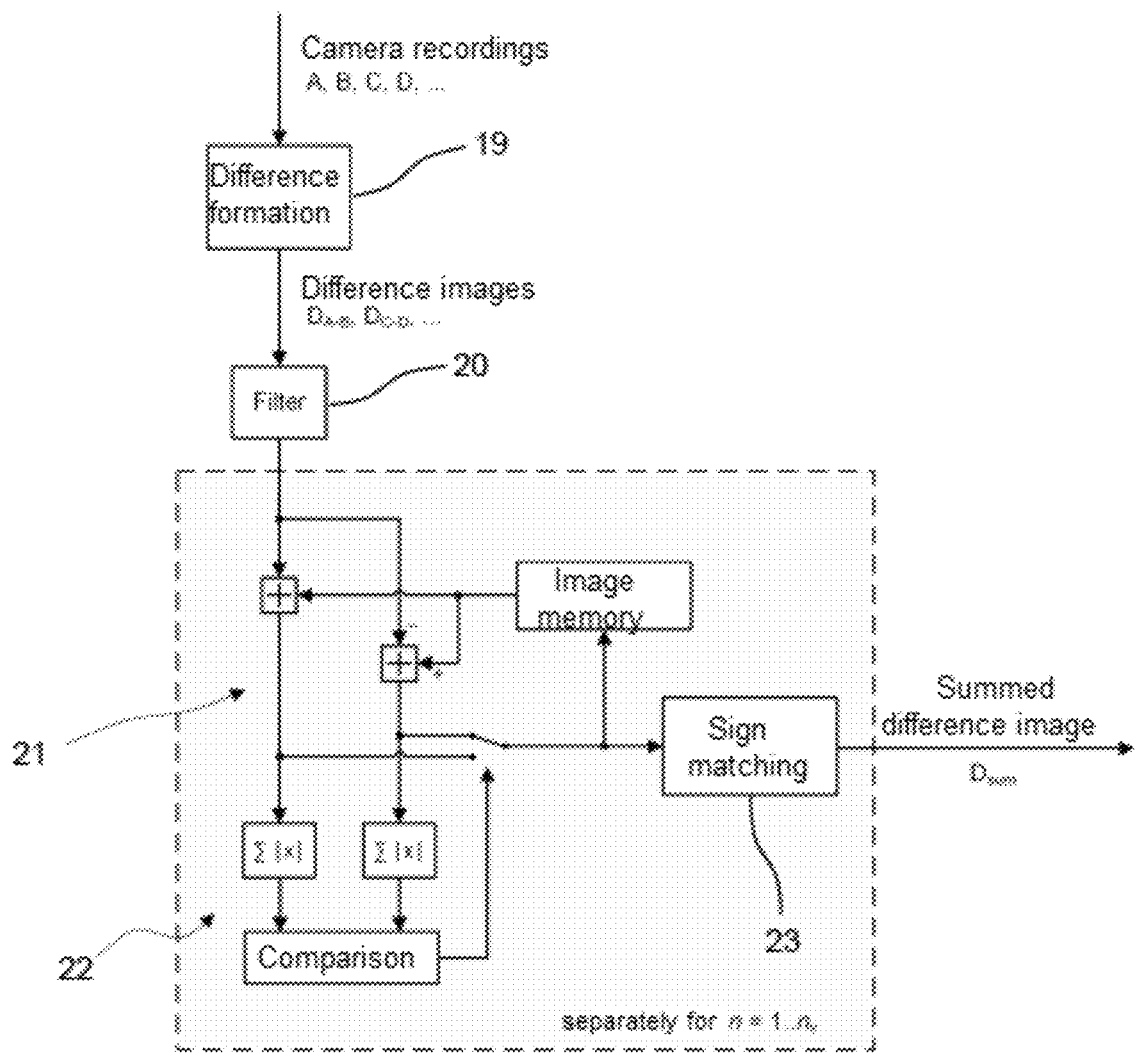
Figure 14:
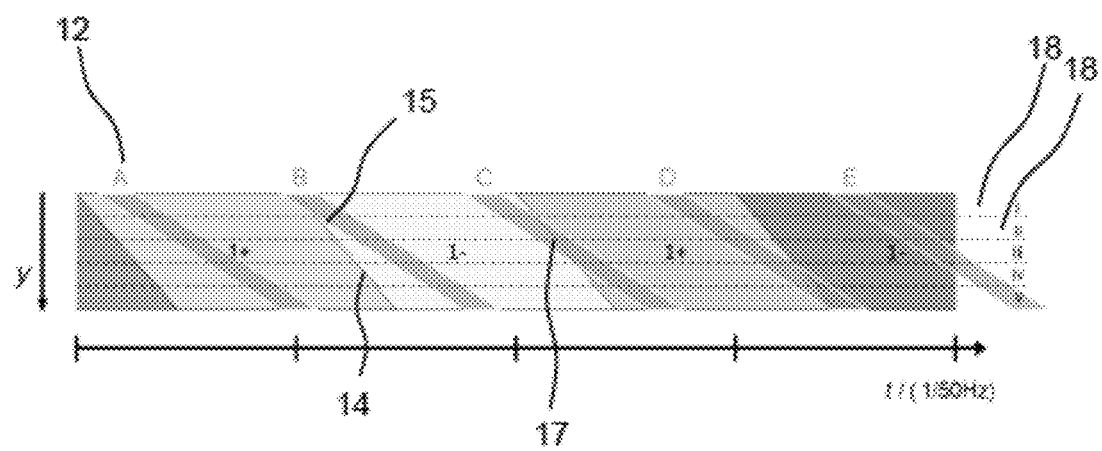
Figure 15:
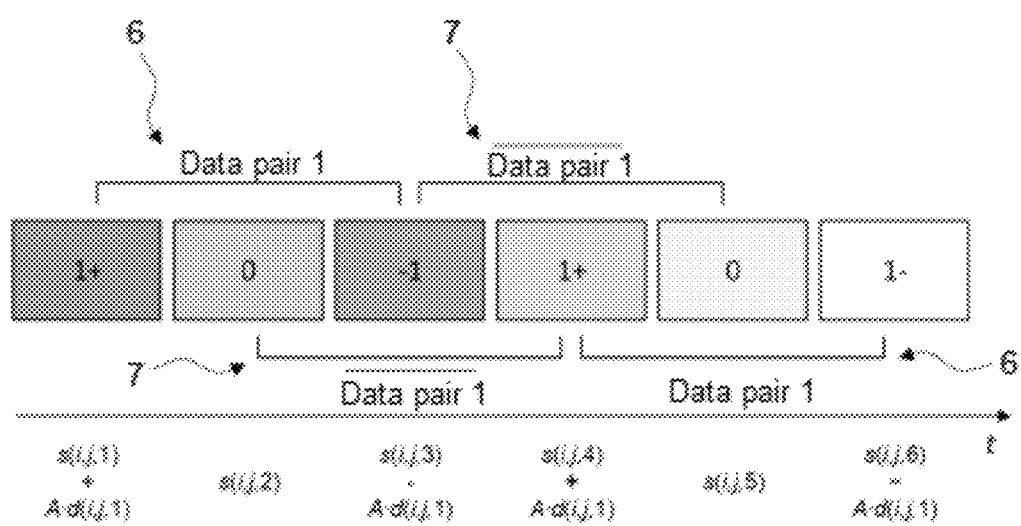

FIG. 6 shows the space-time modelling of an image reproduction in accordance with a first exemplary embodiment of the invention and an image recording for $f_C > f_D$, FIG. 7 shows the space-time modelling of an image reproduction in accordance with a first exemplary embodiment of the invention and an image recording for $f_C > f_D$ with opposite scanning behaviour of display and camera, FIG. 8 shows the space-time modelling of an image reproduction in accordance with a first exemplary embodiment of the invention and an image recording for $f_C = f_D$ once with identical scanning direction and once with opposite scanning direction of the line-by-line scanning behaviour of display and camera, FIG. 9 shows the division of a full HD image recording into $n_v = 10$ vertical spatial image sections of equal size, FIG. 10 shows the two-dimensional division of a full HD image recording into $n_v = 5$ by $n_n = 8$ spatial image sections of equal size, FIG. 11 shows the space-time modelling of an image reproduction in accordance with a first exemplary embodiment of the invention and an image recording for $f_C > f_D$ with an exemplary division of the image recordings into $n_v = 5$ vertical spatial image sections, FIG. 12 shows the space-time modelling of an image reproduction in accordance with a second exemplary embodiment of the invention and an image recording for $f_C = f_D$, FIG. 13 shows a signal flow diagram of the receiver according to a second exemplary embodiment of the invention, FIG. 14 shows the space-time modelling of an image reproduction in accordance with a second exemplary embodiment of the invention and an image recording for $f_C > f_D$ with an exemplary division of the image recordings into $n_v = 5$ vertical spatial image sections, FIG. 15 shows an alternative temporal display sequence of the modulation of a pixel-based data packet with use of the time differential modulation without image content repetition in accordance with a further exemplary embodiment of the invention.

DETAILED DESCRIPTION

FIG. 1 shows an arrangement for the optical transmission of data in free space from a transmitter 1 to a receiver 2. The transmitter 1 is an imaging device 1 with a plurality of image points 3, here in the form of a television with flat screen. The receiver 2 is a mobile terminal for telecommunication, for example a smartphone with integrated camera 4 for recording the transmitted data. Data to be transmitted from the transmitter 1 to the receiver 2 is an image signal which is visualised on the television 1 and usually contains moving images, i.e. superposed data. The television 1 thus receives additional data besides the conventional image signal.

The data to be transmitted may be useful data or control data. For example, photos or music items whilst watching television may thus be downloaded from the Internet or a local network and transmitted via the free space transmission according to the invention from the television 1 to the terminal 2. Control data may also be transmitted, for example by a bus of the building automation system, from the television to the terminal and in this way any devices such as lights, heating, blinds, projectors, etc. may be controlled.

A signal processor in the television 1 modulates the data onto the television image such that the data is not visible to a viewer. The camera 4 in the smartphone 2 records the modulated television image. A processor with implemented demodulator and decoder performs a demodulation and decoding to recover the data from the television image and provides the data for the application on the terminal 2. The user merely has to align the camera 4 roughly for this. The receiver 2, however, does not have to be a mobile terminal. It may also be arranged in stationary fashion in the room.

FIG. 2 shows a temporal display sequence of six successive images of an image sequence. Three pixel-based data packets d(i, j, m) are transmitted differentially within the shown time portion, wherein the time differential modulation is used with image content repetition in accordance with a first exemplary embodiment of the invention. In the time differential modulation according to a first exemplary embodiment of the invention an image and data repetition is implemented in the time direction, which means that each individual image of the original video sequence is repeated once. Two identical, successive individual images of the video are combined to form an image pair 5. A pixel-based data packet d(i, j, m) is superposed on the first image of an image pair 5 with positive sign and is superposed on the second image of the same image pair 5 with negative sign. For recovery of the data, the difference from the recordings of the two modulated image pairs 5 is produced in the receiver 2. In order to increase the data throughput, a new pixel-based data packet d(i, j, m) is allocated to each image pair 5 of the image sequence.

FIG. 3 shows a temporal display sequence of the modulation of a pixel-based data packet d(i, j, m) with use of the time differential modulation without image content repetition in accordance with a second exemplary embodiment of the invention. In the second exemplary embodiment time differential modulation is used, just as in the first exemplary embodiment. The main difference is that only a data packet of limited size is transmitted, rather than a continuous data stream. Proceeding from FIG. 2, the same pixel-based data packet d(i, j, m) is therefore superposed with each image pair 5. The concept provides that only a small data amount—for example an Internet link—will be transmitted. By utilising the redundancy in the time direction—the camera receives the same pixel-based data packet d(i, j, m) more than once—the transmission may be robust even with use of very small modulation amplitudes. Furthermore, in this second exemplary embodiment there is no repetition of the image content. The method should hereby function also with a possible limitation of the maximum image reproduction rate to 25 or 30 Hz. The temporal repetition of the image content would otherwise limit the image content reproduction to 12.5 or 15 Hz, which is inadequate. FIG. 3 shows the temporal display sequence in accordance with the second exemplary embodiment without image content repetition. It can be seen that the pixel-based data packet d(i, j, m) may be produced theoretically from any difference of any successive display individual images without consideration of image content changes in the receiver 2, wherein the sign of the difference image is inverted in each second data pair 7. By summing a plurality of difference images of the same data pair 6 or 7, the signal-to-noise ratio of the difference image may be improved, whereby the robustness of the transmission increases with the number of image recordings 12 used for production of a difference image. The objective of the time synchronisation in the second exemplary embodiment is to produce a difference image by the summing, inclusive of sign, of a plurality of individual difference images, wherein it should be taken into consideration that the image content of the image sequence displayed in parallel on the imaging device may change in each image.

FIG. 4a) shows the modelling 10 of the space-time reproduction behaviour of typical LCD displays. It is known that LCD or OLED screens (both TV devices and computer monitors) have a rectangular aperture in the time direction. Here, the image content is typically maintained over the entire possible display duration of an individual image (for example 20 ms at 50 Hz). A possible pulse width modulation of the LED background light in LCD screens or a black frame insertion in OLED screens is omitted at this juncture. Here, however, the image content at the transition 8 from one individual image 16 to the next during the reproduction of a video is updated generally not time-synchronously for all pixels, but line by line with a time offset 14. FIG. 4a) shows this time-space reproduction behaviour by way of example on the basis of an image reproduction with 60 images per second, corresponding to an image display duration of 16.67 ms. The horizontal axis in this depiction represents the time dimension. The vertical axis represents the vertical spatial dimension of the display, i.e. the fact that the origin of y represents the uppermost line of the display. The regions characterised by different levels of brightness each represent an image of the image sequence 16. The time difference $t_{Scan}$ between the update of the first line and the update of the last line in this case is approximately 7.5 ms, and the mean reaction time of the LCD display modelled here by way of example is $\bar{t}_R$=3 ms, which by implication means that the image content of an individual image is displayed fully, i.e. simultaneously by all pixels, not for $t_D$=16.67 ms, but instead for a duration of $t_{full}$=6.17 ms. It should be noted at this juncture that this scanning behaviour 14 of displays is not implemented consistently, varies from device to device. Measurements in a laboratory have revealed that displays exist in which $t_{Scan}$ is only slightly smaller than $t_D$, and so the entire image content of an individual image 16 is practically never shown by all lines of the display. When measuring another display, it was found that the scanning behaviour 14 was implemented in an opposite direction, which means that the line-based updating starts with the lowermost line, and the uppermost line is updated last.

FIG. 4b) shows the space-time modelling of the image recording 11 of a CMOS camera, wherein 4 individual images of the image recording 12 are shown. The horizontal axis in this depiction represents the time dimension. The vertical axis represents the vertical spatial dimension 9 of the camera sensor or the image recording. It is known that such a space-time scanning behaviour is also widespread in CMOS camera sensors. Reference is made in this case to a rolling-shutter sensor. In rolling-shutter sensors the light-active elements of the camera sensor are not read and exposed 15 simultaneously, but line-by-line with a time offset, which leads to the known rolling-shutter effect when recording motion. The time offset between the exposure of successive sensor lines may vary here—similarly to the time offset of the line-based updating of the display reproduction 14. By contrast, global-shutter sensors exist, which allow a simultaneous exposure of all light-active sensor elements. However, the use of rolling-shutter camera sensors is very widespread for smartphone cameras.

FIG. 5 shows by way of example the space-time modelling 10 and 11 of different reproduction-recording combinations which may result when recording a 60 Hz image reproduction 10 with a rolling-shutter camera with an image recording rate of $f_C$=60 images per second and an exposure time of $t_{exp}$≈3 ms 3 without phase synchronisation—that is to say with random recording phase 13. 5a) and 5b) show cases in which the orientation of the scanning direction of camera and display are the same. Due to the random recording start time of the camera, in the scenario shown in FIG. 5b) there is a blending of image contents within the image recordings 12, and resultant image transitions 17 of the image sequence shown on the transmitter side within the image recordings 12. By contrast, the image recording 11 in scenario a) is sufficiently phase-synchronous, so as to ensure an error-free image recording 11 with the shown combination of display and camera and the selected exposure time $t_{exp}$. FIG. 5c) shows the case that no phase synchronisation can be achieved on account of the opposite orientation of the line-based scanning of display and camera.

FIG. 6 shows a space-time modelling of an image reproduction 10 in accordance with a first exemplary embodiment of the invention and an image recording 11 for $f_C$>$f_D$. The purpose of the synchronisation algorithm in this first exemplary embodiment is to realise a section-based image pair allocation, in which the individual images of an image pair 5 may be situated in different image recordings 12. FIG. 6 illustrates the principle. The image reproduction 10 of the display in this case occurs with an image reproduction rate of $f_D$=50 Hz, whereas the camera records with $f_C$=60 Hz. The reaction time of the display is negligibly short. Within the shown section, for individual images are displayed by the display (1+, 1−, 2+, 2−), with the aid of which two difference images ((1+)−(1−), ((2+)−(2−)) may be produced. The individual image recordings of the camera 12 are denoted by capital letters. It can be seen that the upper 20% of the first difference image in the optimal case are produced from image recordings A and C, whereas the lower 80% may be composed of recording A and recording B (partition line i). In order to produce the second difference image, recording E may be used as subtrahend for the entire difference image, wherein recording D should be selected as minuend for the upper 60% and recording C should be selected as minuend for the lower 40% (partition line ii).

The image recording rate $f_C$ and exposure time $t_{exp}$ of the camera is selected in the example shown in FIG. 6 in such a way that precisely one point is produced on the y-axis at the image transitions 17 within the image recordings 12, at which point a change of the image recordings for production of a difference image is expedient (dashed partition lines). An increase of the image recording rate $f_C$ of the camera with constant exposure time $t_{exp}$ or a reduction of the exposure time $t_{exp}$ with constant image recording rate $f_C$ would by contrast lead to a transition region in which two equivalent recordings of a display image exist. With a reduction of the image recording rate $f_C$ with constant exposure time $t_{exp}$ or an increase of the exposure time $t_{exp}$ with constant image recording rate $f_C$, a transition region would by contrast be created in which there is no completely ISI-free recording of both individual images. The image recording rate $f_C$ and exposure time $t_{exp}$ selected in FIG. 6, with the given image reproduction rate $f_D$ consequently represent an optimal working point at which all images of the shown image sequence may be fully reconstructed. A mathematical relationship between the used image recording rate $f_C$, the exposure time $t_{exp}$, and the image reproduction rate of the display $f_D$ may be derived for this working point from the geometric conditions of the space-time modelling:

$$\frac{1}{f_D} - \frac{1}{f_C} \geq t_{exp} \quad (1)$$

$$f_C \geq \left(\frac{1}{f_D} - t_{exp}\right)^{-1} \quad (2)$$

The relationship may be described as follows. At a given display image reproduction rate $f_D$ and an exposure time $t_{exp}$ desired for the recording, the image recording rate $f_C$ must be at least as high as the value calculated according to (3) so that a completely ISI-free recording of each individual image is provided in the receiver. Conversely: At a given image reproduction rate $t_D$ and an image recording rate $f_C$ available in the receiver camera ($f_C > f_D$) the exposure time $t_{exp}$ must correspond at most to the difference of the reciprocal values of both frequencies (2). The exposure time $t_{exp}$ selected in the example from FIG. 6 corresponds to the maximum value at the selected frequencies ($f_D$=50 Hz, $f_C$=60 Hz) of 3.34 ms. The mathematical relationships shown at (1) and (2) and the resultant conclusions are also valid if the scanning behaviour of camera and display are opposite on account of an inverse orientation, wherein here the number of occurring image transitions 17 is higher. FIG. 7 shows the space-time modelling of an image reproduction 10 in accordance with a first exemplary embodiment of the invention and an image recording 11 for $f_C > f_D$ with opposite scanning behaviour of display and camera, The equations (3) and (4) extend the relationships (1) and (2) by the mean display reaction time $\overline{t_R}$ typical for LCDs, whereby with constant image recording rate $f_C$ the available exposure time $t_{exp}$ is reduced by $\overline{t_R}$ or with constant exposure time $t_{exp}$ the necessary image recording rate $f_C$ of the camera rises. A shortest possible display reaction time is therefore advantageous for the method.

$$t_{exp} \leq \frac{1}{f_D} - \frac{1}{f_C} - \overline{t_R} \quad (3)$$

$$f_C \geq \left(\frac{1}{f_D} - t_{exp} - \overline{t_R}\right)^{-1} \quad (4)$$

FIG. 8 shows a space-time modelling of an image reproduction 10 in accordance with a first exemplary embodiment of the invention and an image recording 11 for $f_C = f_D$ once with identical scanning direction and once with opposite scanning direction of the line-by-line scanning behaviour of display 14 and camera 15. In this case there is no oversampling according to (2) or (4), which means that transition regions 17 which in all image recordings 12 are located in the same vertical image region may be created depending on the relative recording phase 13. Similarly to the previously described examples, a linear transition 17 takes place within these regions between two individual images of the image sequence. Without oversampling, however, no ISI-free substitute recordings of the individual images in the transition region 17 exist in the receiver. The two adjacent individual images transition linearly into one another within the transition region 17. In the middle of the transition regions 17 denoted in the image by the auxiliary lines (at the height of the point of intersection of the red lines), the image recordings 12 are therefore composed in each case of exactly 50% of the adjacent individual images of the image sequence 16. In recording B and D this therefore leads in FIG. 8a) to a complete erasure of the superposed pixel-based data packet at said point, whereas in recording A and C there is a mixing of the adjacent mutually independent pixel-based data packets. Without a suitable oversampling by the camera, image regions may therefore be created in which the individual images are not fully provided, and therefore the difference images may not be generated correctly.

In order to be able to perform a section-based allocation of the image recordings 12 of the camera, all (rectified and locally synchronised) image recordings 12 are divided in the vertical direction into $n_v$ (for example $n_v$=10) vertical image sections 18 of equal size. This is shown in FIG. 9.

FIG. 10 shows the two-dimensional division of an exemplary full HD image recording 12 into $n_v$=5 vertical image sections 18 and $n_h$=8 horizontal image sections 24, which may be used in a second exemplary embodiment of the invention.

It is firstly assumed that the background image material is not a video, but a static image. The purpose of the algorithm is to find successively all possible image pair allocations within the image recordings 12 and to assemble the difference images on the basis of the allocation table. To this end, all eligible differences for each vertical image section 18 are produced and evaluated. Here, it is firstly sufficient for the evaluation to use just one modulated colour channel. With the modulation of the colour difference channels U and V of the YUV colour space, the U or the V channel could consequently be used. The evaluation consists fundamentally in that, for each section n all differences of the modulated colour channel modCh eligible for an allocation are produced and in each case the mean figure of the difference pixel values $B_{sum,modCh}(k_X,k_Y,n)$ is formed (6). A size comparison of $B_{sum,modCh}(k_X,k_Y,n)$ for all eligible combinations from the image recordings $k_X$ and $k_Y$ within a section n delivers the correct allocation for this section.

$$B_{sum,modCh}(k_X, k_Y, n) = \sum_{p=1}^{W} \sum_{q=(n-1)\cdot H+1}^{n\cdot H} |r_{modCh}(p, q, k_X) - r_{modCh}(p, q, k_Y)| \quad (5)$$

Here:
- $k_X$, $k_Y$ image recording index no. X, Y
- N running index of the vertical image sections 18, n=1 . . . $n_v$
- p, q image sensor pixel coordinates of the image recordings 12
- W, H image width W and image height H of the image recordings 12 in image sensor pixel coordinates
- modCh modulated colour channel of the image recordings 12, wherein a modulated colour channel is a colour channel within a colour space which was used on the transmitter side for the pixel-based modulation of the data sequence
- $f_{modCh}(p, q, I_X)$ intensity value, wherein what is meant here is the height of the amplitude of the digital representation of an image, of the colour channel modCH at the image sensor coordinates (p, q) in image recording X Without consideration of the non-linear reproduction behaviour of displays (gamma curve) and on the assumption of an ideal imaging of the display on the camera sensor, three possible situations may occur in principle when calculating $B_{sum,modCh}(k_X,k_Y,n)$ (see Table 2).

In the first case the image recordings $k_X$ and $k_Y$ within the vertical image section n contain recordings of two individual images which belong to an image pair 5. For example, these could be sections of the images of image sequence 16 with the modulated data +1 and −1. The forming of the difference, depending on the data, results in the desired amplitudes 2 A (logic "1") or −2 A (logic "0"). The mean value of the amplitudes $B_{sum,modCh}(k_X,k_Y,n)$ is consequently 2 A.

In the second case the image recordings $k_X$ and $k_Y$ within the vertical image section contain recordings n of two individual images which contain mutually independent pixel-based data packets (Example: −1 and +2). On the assumption of equally distributed data bits, the amplitudes are erased here in half the cases. As a result, the three possible difference amplitudes 2 A, −2 A and 0 are created with the occurrence likelihoods specified in Table 2. The mean value of the amplitudes $B_{sum,modCh}(k_X,k_Y,n)$ in this case assumes the value A and is thus half as big as compared to case 1.

In the third case the image recordings $k_X$ and $k_Y$ within the vertical image section n contain recordings of the same individual images. This case may occur only with an oversampling, that is to say if the image recording rate $f_C$ is greater than the image reproduction rate $f_D$. Due to the same superposed pixel-based data packet and the associated identical modulation in both recordings, the pixel-based data packet is erased as the difference is formed. Consequently: $B_{sum,modCh}(k_X,k_Y,n)=0$.

Case 1 corresponds to correct image pair allocation. For evaluation, a size comparison of $B_{sum,modCh}(k_X,k_Y,n)$ may thus be performed for all eligible differences within a section n, since $B_{sum,modCh}(k_X,k_Y,n)$ in case 1 is always larger than in case 2 or 3. It should be noted that, on account of the exposure time by the camera, one of the three cases does not necessarily occur, and instead there are often combinations of cases within a section. An oversampling according to (3), however, means that case 1 exists for each image line.

An exemplary sequence of the algorithm to be evaluated will be explained hereinafter on the basis of an example. To this end, FIG. 11 again shows the space-time modelling of the reproduction-recording combination known from FIG. 6, wherein $f_C$=60 images per second are recorded by a rolling-shutter camera at an image reproduction rate 10 of $f_D$=50 Hz. The individual image recordings of the image recording 12 are therefore divided in the shown example of the depiction into only $n_v$=5 vertical image sections 18 (i, ii, . . . v). The production of the first difference image shall be reproduced and may be produced from the differences of images 1+ and 1− in the image sequence.

The algorithm performs the image pair allocation section by section, wherein at the start the third or fourth image recording (here recording C) is used as reference, rather than the first recording. Due to the possible oversampling ($f_C$>$f_D$), both the directly adjacent image recordings B and D and the image recordings A and E are eligible for producing a difference image for image recording C. In the first step, $B_{sum,modCh}(k_X,k_Y,n)$ is therefore calculated for the combinations $k_X/k_Y$=A/C, B/C, C/D and C/E. By way of a size comparison, the combination A/C wins, since here a clearer difference according to case 1 is produced. C/D and C/E correspond precisely to case 2, whereas in B/C there is a mixture of cases 1 and 3. The image recording B may also contain an image recording of the display image 1−; the winner A/C in the next step is compared with the previously unconsidered combination A/B. In the present case, however, an improved difference image may be produced in section i by the combination A/C, and therefore this combination is stored in the allocation table (Table 1) for n=1. In section ii the same procedure is repeated, wherein here in the first comparison (A/C, B/C, C/D, C/E) the combination A/C is also strongest. In the second comparison (A/C, A/B), A/B by contrast wins, as can be seen with reference to FIG. 11. On account of the final result A/B from section ii, image recording B rather than image recording C is used as new reference image recording in section 3. A change of reference image recording is then always implemented when the previous reference image recording in the previous section is not part of the final allocation. In this way a phase-false formation of the difference images is counteracted. If the algorithm ii by contrast were continued with image recording C, the difference image 2 would already be produced in section iii-v. In section iii the combinations A/B, B/C and B/D are thus examined, wherein the combination A/B wins in all remaining sections (iii-v). The first difference image may thus be produced in accordance with the allocation in Table 3 from a combination of the image recordings A, B and C. The second difference image is composed of the image recordings C, D and E. The difference images may then be produced in all modulated colour channels on the basis of the allocation table.

TABLE 1

Section-based allocation of the image
recordings A to E according to FIG. 11

| N | 1 | 2 | 3 | 4 | 5 |
|---|---|---|---|---|---|
| Difference image 1 | A-C | A-B | A-B | A-B | A-B |
| Difference image 2 | D-E | D-E | D-E | C-E | C-E |

The mean value of the amplitudes $B_{sum,modCh}(k_X,k_Y,n)$ of a modulated channel is suitable, however—as described—only as a comparison criterion, provided the modulated image material does not contain any movements, or only very slight movements. This is substantiated in the fact that, with image content changes, a difference image according to case 2 (difference from independent pixel-based data packets and any deviating image content) contains not only the useful signal amplitudes (2 A, −2 A and 0) but also difference amplitudes caused by image content changes. In case 1 or 3 this does not occur due to the image content repetition of the time differential modulation. In the event of excessive movement, the mean value of the amplitudes in case 2, due to the image content differences, may assume a higher value than the mean value of the amplitudes in case 1. Consequently, an incorrect decision will be made, which prevents correct difference image production. The comparison criterion (5) therefore must be extended sensibly so that movements of the background video are not taken into consideration or the criterion in this case is sufficiently weakened by the Straf factor. In particular, the inclusion of a second, non-modulated colour channel has proven its worth here. On the assumption that movements in natural image sequences have correlations between the image channels, the reciprocal value of the mean value of an unmodulated colour channel may be included as weighting factor, whereby an extended comparison criterion may be defined:

$$B_{sum,extended}(k_X, k_Y, n) = \frac{B_{sum,modulated\ colour\ channel}(k_X, k_Y, n)}{\sqrt{B_{sum,non-modulated\ colour\ channel}(k_X, k_Y, n)}} \quad (6)$$

It is thus assumed that image contents with movements in a colour channel, for example in a modulated colour channel such as the U or V channel of the YUV colour space, typically also include movements in another colour channel, such as a non-modulated channel, for example the Y channel of the YUV colour space. A mean difference amplitude increased by image content changes in a modulated colour channel will thus be sufficiently weakened by means of division by $$\sqrt{B_{sum,non-modulated\ colour\ channel}(k_X, k_Y, n)},$$

so as to prevent an incorrect decision.

FIG. 12 shows the space-time modelling of an image reproduction 10 in accordance with a second exemplary embodiment of the invention and an image recording 11 for $f_C=f_D$. In accordance with the second exemplary embodiment of the invention, merely one pixel-based data packet per modulated colour channel is transmitted, which means that only one difference image per transmission channel also has to be produced in the receiver. By recording a greater number of image recordings 12 (for example 20) by the camera, however, the same difference image—in respect of the superposed pixel-based data packet—may be produced more than once. Since the noise added by the camera sensor (primarily shot noise) does not correlate between different recordings, a difference image that is improved in respect of the signal-to-noise ratio may be produced by a building superpositioning of the individual difference images.

Similarly to a first exemplary embodiment of the invention, in a second exemplary embodiment of the invention as well it is assumed that the image recording rate $f_C$ of the camera corresponds approximately to the image reproduction rate $f_D$ of the display. Here, however, as in a first exemplary embodiment of the invention, it is advantageous if both rates are not identical, so that any image content transitions 17 occurring in the image recordings 12 are not located in each recording in the same vertical region. For the sake of simplicity it is firstly assumed—as shown in FIG. 12—that image recording 11 and image reproduction 10 synchronous. In accordance with the second exemplary embodiment of the invention the same pixel-based data packet is superposed with each individual image with sign alternating from image to image.

FIG. 13 shows a signal flow diagram of the receiver according to a second exemplary embodiment of the invention and represents an exemplary sequence of the algorithm for summing a plurality of difference images. Firstly, all difference images $D_{X-Y}$ of successive image recordings (X-Y=A-B, C-D, D-E, etc.) are produced 19. The produced difference images are then filtered locally using the filter matrix 20. The first difference image $D_{A-B}$ is by definition the starting difference image, wherein the sign of $D_{A-B}$ is unknown. Whereas the correct difference image is produced by the difference formation of +1 and −1 (correct sign), the difference formation of −1 and +1 leads to the inverted difference image (incorrect sign). In the case shown in FIG. 12 the sign of $D_{A-B}$ is correct. Instead, $D_{B-C}$ would be the starting difference image, and the sign would be incorrect. The following difference images ($D_{B-C}$, $D_{C-D}$, etc.) are added successively to $D_{A-B}$. So as to be able to ensure a building superpositioning and thus an improvement of the difference image, the sign of the difference image to be added must match the sign of the starting difference image. In order to achieve this, the difference image to be added is added once and subtracted once by way of trial 21. It is then determined which operation led to a consolidation of the difference image. To this end the mean value $B_{sum,modCh}(k_X,k_Y,n)$ defined in equation (6) may be used as comparison criterion 22, since this is greater in the case of a building superpositioning than in the case of a destructive superpositioning. Due to the unknown sign of the starting differential image $D_{A-B}$, the sign of the accumulated difference image $D_{akk}$ is also unknown. There are thus two different possible difference images, which must be taken into consideration in the following decoding steps.

In the case shown in FIG. 12, in which the image recording rate $f_C$ corresponds to the image reproduction rate, the size comparison is not necessary in principle for correct accumulation, since the sign alternates from difference image to difference image (A−B, B−C, etc.). With allowance of an image recording rate $f_C$ deviating from the image reproduction rate $f_D$ the comparison is required, however, since the sign change is not predictable in this case. In order to respond to any reproduction and recording timing combinations with image content transitions 17 within the image recordings 12, the summing algorithm is performed section by section, i.e. separately for each image section. The image recordings 12 are divided here into $n_v$ vertical image sections 18 and are processed separately. This is shown in FIG. 14. All processing steps within the dashed frame in FIG. 13 are performed in this case separately for each vertical image section 18n. The initial production of the individual difference images and the subsequent filtering may be performed beforehand on the basis of the complete image recordings 12. The separate execution of the summing, however, means that the signs of the sections do not have to be consistent by image transitions 17 in the image recordings 12. For example, with five sections, it may be that the sign in the first two sections is correct and in the remaining three sections is incorrect. In order to counteract this, the signs of the individual sections are then matched 23, wherein the resultant common sign may still be incorrect. After the sign matching, however, there are only 2 possible difference images instead of $2^{n_v}$.

FIG. 15 shows an alternative temporal display sequence of the modulation of a pixel-based data packet with use of the time differential modulation without image content repetition in accordance with a further exemplary embodiment of the invention. This alternative modulation schema may be used for example in the case in which the image recording rate $f_C$ of the camera is approximately half the image reproduction rate of the display. This may be expedient if the modulated image sequence is reproduced with, for example, 50 or 60 Hz (which reduces the visibility of the superposed pixel-based data packet in comparison to a reproduction with 25 or 30 Hz), however the camera during the image recording 11, with $f_C$=25 Hz or $f_C$=30 Hz, offers a higher image quality, because such an image recording is made possible without lossy source coding/compression. This modulation schema is shown in FIG. 15. As can be seen, three successive images are modulated here in accordance with the following schema: positive data modulation, no data modulation, negative data modulation. This means that, on average, ⅔ of the difference images used for a summing have only have the useful signal amplitude. Due to the significantly reduced visibility of the superposed pixel-based data packet, however, greater modulation amplitudes are possible with the same visibility.

The invention claimed is:

1. A method for time synchronisation of optical transmission of data in free space from a transmitter to at least one receiver,
wherein the transmitter is an imaging device with a plurality of pixels, which are controlled by image data (s(i, j, m)) of an image sequence ($s_n$(i, j)) that represent images, and the data provided for transmission are divided into a data sequence ($d_n$(i, j)) from a data packet comprising a number of data bits and each data bit is associated with at least one of the pixels, and wherein the data packets are each modulated onto the image data (s(i, j, m)) of at least one image of the image sequence ($s_n$(i, j)) in pixel-based fashion in the form of an amplitude modulation,
wherein the modulation of the image data (s(i, j, m)) is performed with a time difference,
the image sequence ($s_n$(i, j)) is formed from image pairs of successive images, and wherein the data sequence ($d_n$(i, j)) is formed from pixel-based data packets (d(i, j, m)), of which each second data packet to be superposed (d(i, j, 2m+1)) corresponds to the preceding first pixel-based data packet to be superposed (d(i, j, 2m)) with reversed sign, and wherein each first pixel-based data packet to be superposed (d(i, j, 2m)) is superposed with each first image of an image pair and each second pixel-based data packet (d(i, j, 2m+1)) to be superposed is superposed with each second image of the image pair, and a difference image is generated in the receiver for recovery of the data sequence ($d_n$(i, j)) from each image pair by subtraction of the second image of an image pair from the first image of the same image pair pixel by pixel,
the receiver comprises a camera capable of recording video to be arranged at a distance from the imaging device, wherein the camera receives the image sequence ($s_n$(i, j)) sent by the imaging device
wherein the method includes making an unsynchronized image recording of the image sequence by the camera at a random recording start time, and
performing a synchronisation after the image recording based on the unsynchronized image recording which is not synchronized in time.

2. The method according to claim 1, wherein
the image sequence ($s_n$(i, j)) is an image sequence of successive image pairs of identical images each with identical image data (s(i, j, m)).

3. The method according to claim 1, wherein
the camera capable of recording video, for an image recording of the camera, has an image recording rate $f_C$ and an exposure time, the imaging device, for an image reproduction of the imaging device, has an image reproduction rate $f_D$ and a mean reaction time $\overline{t_R}$, and the exposure time $t_{exp}$ and the image recording rate $f_C$ are set in accordance with the following mathematical relation:

$$t_{exp} \le \frac{1}{f_D} - \frac{1}{f_C} - \overline{t_R}$$

$$f_C \ge \left(\frac{1}{f_D} - t_{exp} - \overline{t_R}\right)^{-1}.$$

4. The method according to claim 3, wherein
all image recordings of the camera are divided in the vertical image direction into $n_v$ image sections of equal size, wherein the time synchronisation between the image reproduction of the imaging device and the image recording of the camera is performed separately for each vertical image section.

5. The method according to claim 4, wherein
a time synchronisation between the image reproduction of the imaging device and the image recording of the camera is attained in that, in the receiver, after the image recording, a reconstruction of the transmitter-side image sequence ($s_n$(i, j)) is performed on the basis of the image recordings by performing a separate allocation of the image sections within the image recordings of the camera to the individual images of the transmitter-side image sequence ($s_n$(i, j)).

6. The method according to claim 5, wherein
the section-by-section reconstruction of the images of the image sequence ($s_n$(i, j)) displayed by the imaging device is performed on the basis of the image recordings in the receiver in that the image pairs of the transmitter-side image sequence ($s_n$(i, j)) within the image recordings are searched image section by image section in that, in each vertical image section, all difference image sections from all pairs of image sections potentially relevant for the generation of a difference image section are produced from the chronologically successive image recordings and compared with one another, wherein the difference image section which, in relation to a mean signal level, has a strongest data signal created by the modulation of the pixel-based data packet (d(i, j, m)), is used within the particular vertical image section for the subsequent generation of a difference image.

7. The method according to claim 6, wherein
a comparison criterion for the comparison of the potential difference image portions produced section by section is defined, wherein for this purpose the sum of the amounts of all pixel values $B_{sum}(k_X,k_Y,n)$ of the particular difference image section n, which was produced from the image recordings $k_X$ and $k_Y$ by pixel-based subtraction, is used in accordance with the following formula:

$$B_{sum,modCh}(k_X, k_Y, n) = \sum_{p=1}^{W} \sum_{q=(n-1)\cdot H+1}^{n\cdot H} |r_{modCh}(p, q, k_X) - r_{modCh}(p, q, k_Y)|$$

Here:
$k_X$, $k_Y$ image recording index no. X, Y
n running index of the vertical image sections, n=1 ... $n_v$
p, q image sensor pixel coordinates of the image recordings
W, H image width W and image height H of the image recordings in image sensor pixel coordinates
modCh modulated colour channel of the image recordings, wherein a modulated colour channel is a colour channel within a colour space which was used on the transmitter side for the pixel-based modulation of the data sequence
$r_{modCh}(p, q, I_X)$ intensity value, wherein what is meant here is the height of the amplitude of the digital representation of an image, of the colour channel modCH at the image sensor coordinates (p, q) in image recording X.

8. The method according to claim 7, wherein
an extended comparison criterion is defined, in which $B_{sum}(k_X,k_Y,n)$ a calculation is made in each case for a modulated colour channel and for a colour channel not used for the data modulation, that is to say a non-modulated colour channel, wherein a modulated colour channel is a colour channel within a colour space which was used on the transmitter side for the pixel-based modulation of the data sequence, wherein the extended comparison criterion is then calculated as follows:

$$B_{sum,erweitert}(k_X, k_Y, n) = \frac{B_{sum,modulated\ colour\ channel}(k_X, k_Y, n)}{\sqrt{B_{sum,non-modulated\ colour\ channel}(k_X, k_Y, n)}}.$$

9. The method according to claim 1, wherein
the same pixel-based data packet (d(i, j, 2m)) is superposed with each image pair.

10. The method according to claim 9, wherein
a group of bs×bs pixels of the imaging device are combined to form a data block which is modulated by the same data bit of the data sequence $d_n(i, j)$, wherein a transmitter-side local filtering of each pixel-based data packet (d(i, j, m)) is additionally performed with the following filter matrix:

$$\overbrace{\begin{bmatrix} 1 & \cdots & 1 & -1 & \cdots & -1 \\ \vdots & \ddots & \vdots & \vdots & \ddots & \vdots \\ 1 & \cdots & 1 & -1 & \cdots & -1 \\ -1 & \cdots & -1 & 1 & \cdots & 1 \\ \vdots & \ddots & \vdots & \vdots & \ddots & \vdots \\ -1 & \cdots & -1 & 1 & \cdots & 1 \end{bmatrix}}^{bs} \Big\} bs.$$

11. The method according to claim 10, wherein
from the amount of provided image recordings of the camera, the difference image that is the same in respect of the superposed pixel-based data packet (d(i, j, m)) is produced more than once in the receiver, and the resultant difference images that are the same in respect of the pixel-based data packet (d(i, j, m)) are summed pixel by pixel, thus resulting in an improved signal-to-noise ratio as compared to an individual difference image.

12. The method according to claim 11, wherein
each image recording of the camera or each of the produced individual difference images in the receiver is subjected before the further processing to a local filtering with the same filter matrix with which each pixel-based data packet (d(i, j, m)) was filtered locally on the transmitter side.

13. The method according to claim 12, wherein
the produced and locally filtered difference images are summed inclusive of sign, wherein, from the second produced difference image, the new difference image to be summed is additively superposed by way of trial with the first difference image or the previous difference images already summed at this point, once with positive and once with negative pixel-based sign, and then the sign with which the data signal contained in the summed difference image and created by the transmitter-side modulation of the pixel-based data packet (d(i, j, m)) is strongest is determined in a comparison of the two difference images summed by way of trial.

14. The method according to claim 13, wherein
for the comparison of the strength of the data signal contained in the difference images summed with positive and negative sign by way of trial, the sums of the amounts of the intensity values, wherein what is meant here is the height of the amplitude of the digital representation of the summed difference image, of all pixels of the resultant difference images are compared with one another.

15. The method according to claim 14, wherein
each image recording of the camera or each of the produced difference images in the receiver is divided into $n_v$ vertical image sections of equal size, wherein the summing, inclusive of sign, of the produced difference images is performed separately for each vertical image section.

16. The method according to claim 15, wherein
following the section-based summing, inclusive of sign, of the difference images, the possibly different signs of the individual image sections, if necessary, are matched to one another by comparing the boundaries between the image sections that are potentially to be matched in respect of the sign, wherein a high negative correlation indicates a sign difference and a high positive correlation indicates a sign uniformity between two adjacent sections.

17. The method according to claim 16, wherein
each three chronologically successive images of the imaging device are combined to form an image group and are modulated, wherein in each case the first image is modulated with positive sign, the second image is not modulated, and the third image is modulated with negative sign.

18. The method according to claim 14, wherein
each of the produced difference images in the receiver is divided into $n_v$ vertical image sections of equal size and into $n_h$ horizontal image sections of equal size, whereby a two-dimensional arrangement of $n_v \times n_h$ image sections is created, wherein the summing, inclusive of sign, is performed separately for each image section.

19. A device for carrying out the method according to claim 1.

* * * * *